United States Patent
Park

(10) Patent No.: US 11,327,659 B2
(45) Date of Patent: May 10, 2022

(54) APPARATUS AND METHOD FOR IMPROVING INPUT/OUTPUT THROUGHPUT OF MEMORY SYSTEM

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 7 days.

(21) Appl. No.: 16/900,457

(22) Filed: Jun. 12, 2020

(65) Prior Publication Data
US 2021/0191625 A1 Jun. 24, 2021

(30) Foreign Application Priority Data
Dec. 20, 2019 (KR) .................. 10-2019-0171587

(51) Int. Cl.
*G06F 3/06* (2006.01)

(52) U.S. Cl.
CPC .......... *G06F 3/0613* (2013.01); *G06F 3/0631* (2013.01); *G06F 3/0656* (2013.01); *G06F 3/0659* (2013.01); *G06F 3/0673* (2013.01)

(58) Field of Classification Search
CPC .... G06F 3/0659; G06F 3/0673; G06F 3/0631; G06F 3/0656; G06F 3/0613; G06F 3/0688; G06F 3/0616
USPC .................................................. 711/154, 103
See application file for complete search history.

(56) References Cited

U.S. PATENT DOCUMENTS

| | | | |
|---|---|---|---|
| 8,239,589 B1 | 8/2012 | Certain et al. | |
| 9,229,854 B1 | 1/2016 | Kuzmin et al. | |
| 9,432,298 B1 | 8/2016 | Smith | |
| 2006/0294327 A1* | 12/2006 | Sharma | G06F 13/1631 711/157 |
| 2011/0035538 A1* | 2/2011 | Kim | G06F 12/0607 711/103 |
| 2016/0267011 A1* | 9/2016 | Chang | G06F 3/0611 |
| 2018/0004690 A1 | 1/2018 | Kaminski et al. | |

* cited by examiner

*Primary Examiner* — Hashem Farrokh
(74) *Attorney, Agent, or Firm* — IP & T Group LLP

(57) ABSTRACT

A memory system may include: a plurality of memory dies suitable for storing data therein; a buffer including a plurality of clusters each suitable for buffering data to be outputted to an external device; and a controller coupled to the plurality of memory dies through a plurality of channels, and suitable for: checking control information corresponding to valid clusters among the plurality of clusters, each valid cluster currently buffering data, deciding an operation margin for performing a pairing operation by calculating data processing time associated with the valid clusters based on the control information, and performing the pairing operation during the operation margin.

20 Claims, 11 Drawing Sheets

FIG. 7

| Index # | DATA # | Contol Informatoin | Task ID | Flag | |
|---|---|---|---|---|---|
| Index 0 | DATA 1 | Host I/F | A | 1 | — Zeroth Valid Cluster |
| Index 1 | DATA 2 | Memory I/F | A | 1 | — First Valid Cluster |
| Index 2 | DATA 3 | Memory I/F | B | 1 | — Second Valid Cluster |
| Index 3 | null | FTL | A | 0 | — Third Valid Cluster |
| Index 4 | null | FTL | A | 0 | — Fourth Valid Cluster |
| ⋮ | null | null | null | null | Free Cluster |
| Index N-1 | null | null | null | null | |

Valid Cluster (Zeroth–Fourth)

APPARATUS AND METHOD FOR IMPROVING INPUT/OUTPUT THROUGHPUT OF MEMORY SYSTEM

CROSS-REFERENCE TO RELATED APPLICATION

This application claims priority under 35 U.S.C. § 119 to Korean Patent Application No. 10-2019-0171587, filed on Dec. 20, 2019, which is incorporated herein by reference in its entirety.

BACKGROUND

1. Field

Various embodiments relate to a memory system, and more particularly, to an apparatus and method for improving I/O (Input/Output) throughput of a memory system through an interleaving operation for a plurality of memory dies included in the memory system.

2. Discussion of the Related Art

Recently, the paradigm for the computing environment has changed to ubiquitous computing in which computer systems can be used anytime anywhere. Therefore, the use of portable electronic devices such as mobile phones, digital cameras and notebook computers has rapidly increased. Such portable electronic devices generally use a memory system using a memory device, that is, a data storage device. The data storage device is used as a main or secondary memory device of the portable electronic device.

Since the data storage device using a nonvolatile memory device has no mechanical driver unlike a hard disk, the data storage device has excellent stability and durability, high information access speed, and low power consumption. Examples of data storage devices used in memory systems having such advantages includes a universal serial bus (USB) memory device, a memory card having various interfaces, a solid state drive (SSD) and the like.

SUMMARY

Various embodiments are directed to a memory system which can minimize the complexity and performance degradation thereof, maximize the use efficiency of a memory device, and thus stably and rapidly process data to the memory device, and an operating method thereof.

Also, various embodiments are directed to an apparatus and method capable of improving I/O throughput of a memory system by inputting/outputting data to/from a plurality of memory dies within the memory system through an interleaving operation.

Also, various embodiments are directed to an apparatus and method which can improve the stability of an operation and the lifetime of a memory system by utilizing a plurality of memory dies, even though physical locations where data are to be stored are not limited for an interleaving operation during a process of storing data in a plurality of memory dies within the memory system.

Also, various embodiments are directed to an apparatus and method which can dynamically decide whether to perform or stop a paring operation in response to the configuration of a memory system, a margin for an internal operation of the memory system and the characteristics of a pairing operation during a data read/write operation performed in the memory system, thereby reducing an unnecessary overhead.

Also, various embodiments are directed to an apparatus and method which can raise the operation efficiency of the memory system through an address allocation structure which can reduce a resource used for a pairing operation and output data to a plurality of memory dies within the memory system through an interleaving operation.

Also, various embodiments are directed to an apparatus and method which can check control information corresponding to valid clusters other than free clusters among a plurality of clusters included in a buffer, and accurately calculate a data processing time required until data associated with the valid clusters are outputted to an external device, based on the control information, thereby increasing the operation efficiency of the memory system.

In an embodiment, a memory system may include: a plurality of memory dies suitable for storing data therein; a buffer including a plurality of clusters each suitable for buffering data to be outputted to an external device; and a controller coupled to the plurality of memory dies through a plurality of channels, and suitable for: checking control information corresponding to valid clusters among the plurality of clusters, each valid cluster currently buffering data, deciding an operation margin for performing a pairing operation by calculating data processing time associated with the valid clusters based on the control information, and performing the pairing operation during the operation margin.

In an embodiment, there is provided an operating method of a memory system which includes a plurality of memory dies suitable for storing data therein, a buffer including a plurality of clusters each suitable for buffering data to be outputted to an external device and a controller coupled to the plurality of memory dies through a plurality of channels, the operating method comprising: receiving a plurality of read requests from an external device; calculating data processing time based on control information of valid clusters within the buffer, each valid cluster currently buffering data, the data processing time being the time it takes to output data from the valid clusters to the external device; deciding, based on the data processing time, an operation margin for a pairing operation on some of the plurality of read requests; performing the pairing operation according to logical addresses transferred with the plurality of read requests during the decided data processing time; transferring the paired read requests to the plurality of memory dies through the plurality of channels; receiving data corresponding to the paired read requests from the memory dies through the plurality of channels in an interleaving manner; and outputting the received data to the external device.

In an embodiment, a memory system may include: a plurality of memory dies suitable for storing data therein; a buffer including a plurality of clusters each suitable for buffering data to be outputted to an external device; and a controller coupled to the plurality of memory dies through a plurality of channels, and suitable for performing a pairing operation on at least some of a plurality of read requests such that the plurality of memory dies output data corresponding to the paired read requests through the plurality of channels in an interleaving manner, wherein the controller checks the number of valid clusters associated with data to be outputted to the external device, based on task information corresponding to valid clusters other than free clusters among a plurality of clusters included in a buffer, decide an operation margin for performing the pairing operation by calculating a data processing time to output data to the external device, and wherein the controller performs the pairing operation during the data processing time.

In an embodiment, a memory system may include: a memory device including plural memory dies each having plural sections; a buffer suitable for buffering data to be output from the memory system; and a controller operably coupled to the memory dies through respective channels and suitable for controlling the memory device to perform an interleaved read operation on sections of a same offset in the respective memory dies under a full synchronous interleaving scheme by pairing two or more discrete read requests based on locations of the sections storing read-requested data within the respective memory dies, wherein the controller performs the pairing based on an amount of time expected for the controller to control the buffer to output the buffered data to maintain data I/O throughput of the memory system.

The effects of the apparatus and method in accordance with embodiments are as follows.

The apparatus and method can reduce an overhead within the memory system for the interleaving operation while removing or reducing address limitation on physical locations within the memory system for the interleaving operation.

Furthermore, the apparatus and method can reduce address limitation on physical locations within the memory system for the interleaving operation while improving the I/O throughput of the memory system through the interleaving operation, thereby improving the efficiency and lifetime of the memory device.

Furthermore, the controller within the memory system can estimate an operation margin for a pairing operation, and perform the pairing operation within the estimated operation margin, such that data can be inputted/outputted through the interleaving operation while an overhead within the memory system is avoided, thereby improving the throughput of the memory system.

Furthermore, the controller can check the control information corresponding to valid clusters other than free clusters among a plurality of clusters included in a buffer, and accurately calculate a data processing time required until data are outputted from the valid clusters to an external device, based on the control information, thereby improving the throughput of the memory system.

BRIEF DESCRIPTION OF THE DRAWINGS

FIG. 7 illustrates attribute information on clusters within a buffer in accordance with a present embodiment of the invention.

DETAILED DESCRIPTION

Figure 1:
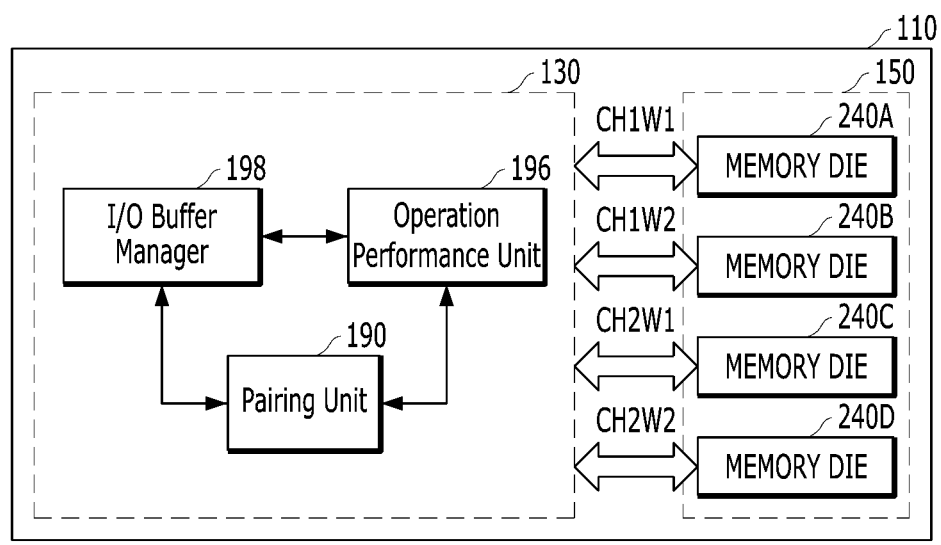
FIG. 1 illustrates a memory system according to an embodiment of the invention.

Various embodiments of the present invention are described below in more detail with reference to the accompanying drawings. However, elements and features of the present disclosure may be configured or arranged differently than disclosed herein. Thus, the present invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. It is noted that reference to "an embodiment," "another embodiment", and the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected or coupled, may be wired or wireless, unless stated or the context indicates otherwise.

In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 2:
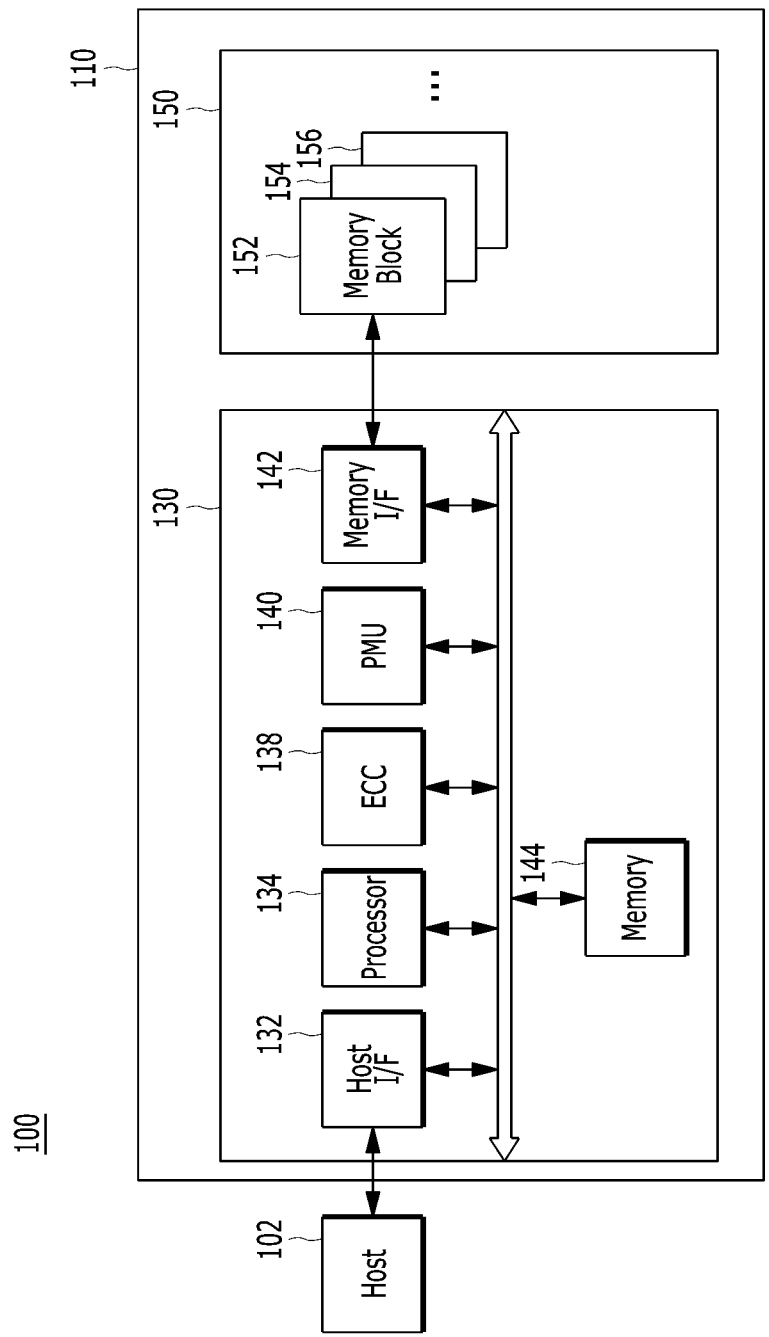
FIG. 2 illustrates a data processing system including a memory system according to an embodiment of the invention.

FIG. 1 illustrates a memory system in accordance with an embodiment. For example, the memory system 110 may be mounted in a computing device or mobile device, and configured to transmit data to, and receive data from, a host 102, which is shown in FIG. 2.

Referring to FIG. 1, the memory system 110 includes a controller 130 and a memory device 150. The controller 130 may control the memory device 150 to output data requested by the host 102, or control the memory device 150 to store data transferred from the host 102 therein. The memory device 150 may include a plurality of blocks, each including a plurality of cells capable of storing data therein. The design of the internal configuration of the memory device 150 may be changed according to the characteristics of the memory device 150, the purpose of use of the memory system 110 or the specification, e.g., communication protocol, of the memory system 110 requested by the host 102.

The controller 130 and the memory device 150 may be coupled to each other through a plurality of data paths. For example, the memory device 150 may include a plurality of memory dies 240A to 240D. The plurality of memory dies 240A to 240D included in the memory device 150 may be coupled to the controller 130 through different data paths. Referring to FIG. 1, the first memory die 240A and the controller 130 may be coupled through a first channel and first way CH1W1, and the second memory die 240B and the controller 130 may be coupled through a first channel and second way CH1W2. Furthermore, the third memory die 240C and the controller 130 may be coupled through a second channel and first way CH2W1, and the fourth memory die 240D and the controller 130 may be coupled through a second channel and second way CH2W2. The numbers of channels and ways constituting the data paths between the controller 130 and the memory device 150 may be changed according to the number of the memory dies included in the memory device 150. The numbers of channels and ways for coupling the memory dies 240A to 240D to the controller 130 may be changed according to the purpose of use of the memory system 110 or the specification of the memory system 110, requested by the host 102.

The plurality of memory dies 240A to 240D within the memory device 150 may be considered as different modules, and coupled to the controller 130 through different data paths. When the plurality of memory dies 240A to 240D and the controller 130 do not exchange data through one data path, the plurality of memory dies 240A to 240D and the controller 130 may exchange data through an interleaving operation therebetween, thereby increasing a data transfer rate.

For the interleaving operation to increase the data transfer rate between the memory device 150 and the controller 130 within the memory system 110, data are not stored in one module within the memory device 150, but need to be distributed and stored in various modules. For this configuration, a conventional memory system has employed a scheme for distributing and storing new data into a plurality of modules within the memory device 150, when storing the new data. For example, when programming four pieces of data, the conventional memory system may store the four pieces of data in four memory dies, respectively.

In order to increase the efficiency of program and read operations, the conventional memory system has employed address limitation as well as the distributed storage. The address limitation refers to an operation of storing four pieces of data at the same locations of the respective dies, when storing the four pieces of data in the respective memory dies. For example, when storing the four pieces of data in the respective memory dies, the memory system stores the data at fifth physical locations of the respective memory dies. Then, when programming eight pieces of data, the memory system stores the eight pieces of data at sixth and seventh physical locations of the respective memory dies. The physical location may indicate the physical address of a block or page within a memory die.

Suppose that five pieces of data are programmed to the memory system in which the above-described address limitation scheme has been employed. When the five pieces of data are stored in four memory dies, two pieces are allocated to one memory die, but only one piece may be allocated to each of the other three memory dies. The memory system employing the address limitation scheme cannot subsequently write data, which is to be programmed next time, to the other three memory dies. Therefore, the memory system writes dummy data to the other three memory dies.

The conventional memory system has employed the address limitation scheme for the interleaving operation, and may have low efficiency due to the address limitation scheme. Furthermore, since each of the memory dies does not have the same operation state (healthy, wear or the like) at all times, the memory system needs to internally perform an additional operation (overhead), in order to compensate for the operation state.

The memory system 110 in accordance with an embodiment does not employ the address limitation scheme, but employs a full sync interleaving scheme capable of supporting an interleaving operation. The full sync interleaving scheme has no address limitation in which the memory system needs to store data at the same locations of the plurality of memory dies 240A to 240D within the memory device 150 when storing the data in the respective memory dies. Depending on the internal operation situations and operation states of the respective memory dies, the controller 130 may distribute the data to be programmed. For example, when one memory die (for example, 240A) among the four memory dies 240A to 240D cannot program data immediately due to an internal operation, the controller 130 may transfer the data to the other three memory dies 240B to 240D, in order to program the data. The controller 130 distributes and transfers data to the plurality of memory dies in order to increase the data transfer efficiency for high program speed, but a strict rule such as the address limitation scheme is not applied. Furthermore, the memory system 110 in accordance with an embodiment does not need to program unnecessary dummy data unlike the address limitation scheme.

After programming the data into the memory device 150, the controller 130 may generate or update map information for connecting a logical address corresponding to the data to a physical location (i.e. physical address). The controller 130 may store the generated or updated map information in the memory device 150.

As described above, the memory system 110 does not employ the address limitation scheme. Thus, during a process of reading and outputting data requested by the host or an external device, the memory system 110 cannot expect that an interleaving operation between the controller 130 and the memory device 150 will be performed. Therefore, the controller 130 may include a pairing operation unit 194 which pairs operations such that the interleaving operation is performed during the process of reading the data requested by the host or the external device from the memory device 150.

Referring to FIG. 1, the controller 130 may include an I/O buffer manager 198, the pairing operation unit 194 and an operation performance unit 196.

The I/O buffer manager 198 may control an input buffer 184 and/or an output buffer 186. The input buffer 184 may serve to temporarily store a command or data requested by the host or the external device, and the output buffer 186 may serve to temporarily store data corresponding to the command of the host or the external device. For example, when the host or the external device transfers read requests or read commands for data corresponding to 20 logical addresses to the memory system 110, the controller 130 may receive the data for the corresponding logical addresses from the memory device 150, temporarily store the received data in the output buffer 186, and then output the stored data to the host or the external device. The I/O buffer manager 198 may recognize how many data to be outputted to the host or the external device are stored in the output buffer 186.

The operation performance unit 196 within the controller 130 may check physical locations within the memory device 150, corresponding to the logical addresses, and then read the data. In response to the logical addresses and the read requests or read commands transferred from the input buffer 184, the operation performance unit 196 may translate the logical addresses into physical addresses based on the map information, and request data of the corresponding physical addresses from the memory device 150. The physical addresses may indicate specific locations within the plurality of memory dies 240A to 240D of the memory device 150. When the operation performance unit 196 performs the read requests according to the order in which the read requests are transferred by the I/O buffer manager 198, the physical addresses may randomly indicate one of the plurality of memory dies 240A to 240D. In this case, an interleaving operation may be performed or not.

When the I/O buffer manager 198 determines that the output buffer 186 has data to be outputted to the host or the external device, the logical addresses and the read requests or read commands inputted from the host or the external device may be transferred to the pairing operation unit 194.

The pairing operation unit 194 may check the map information on the plurality of logical addresses corresponding to the plurality of read requests transferred from the I/O buffer manager 198, and perform a pairing operation on the plurality of read requests such that the data which the operation performance unit 196 requests from the plurality of memory dies 240A to 240D within the memory device 150 can be transferred to the controller 130 from the memory device 150 through an interleaving operation. The pairing operation may include an operation of matching two or more of the plurality of read requests such that the matched read requests are transferred in parallel to the plurality of memory dies through the plurality of channels, and data are outputted, in response to the matched read requests, in parallel through the plurality of channels from the memory dies coupled to the respective channels. For example, the pairing operation may include an operation of matching read requests related to physical locations where the interleaving operation is possible, among the plurality of read requests. The physical locations where the interleaving operation is possible may include physical locations where data can be transmitted/received, in parallel, through different channels.

Suppose that the host or the external device requests 20 pieces of data stored in the memory system 110. The controller 130 may receive read requests for the 20 pieces of data from the host or the external device. The I/O buffer manager 198 may transfer the read requests for the 20 pieces of data to the pairing operation unit 194. The pairing operation unit 194 may pair the read requests for the 20 pieces of data. For example, when the pairing operation unit 194 checks the physical address of the first data among the 20 pieces of data requested by the read requests, the pairing operation unit 194 may recognize that the first data is stored in the first memory die 240A. The pairing operation unit 194 may check the physical address of the second data. When the second data is stored in the third or fourth memory die 240C or 240D, the pairing operation unit 194 can expect an interleaving operation on the first and second data because the second data is transferred through a different channel from the first data. Thus, the pairing operation unit 194 may pair the read requests for the first and second data, and transfer the paired requests to the operation performance unit 196.

However, when the second data is stored in the first or second memory die 240A or 240B, the pairing operation unit 194 cannot expect an interleaving operation on the first and second data because the second data is transferred through the same channel as the first data. Therefore, the pairing operation unit 194 does not pair the read requests for the first and second data. The pairing operation unit 194 may check the physical address of the third data. When the third data is stored in the third or fourth memory die 240C or 240D, the pairing operation unit 194 can expect an interleaving operation on the first and third data because the third data is transferred through a different channel from the first data. Thus, the pairing operation unit 194 may pair the read requests for the first and third data, and transfer the paired requests to the operation performance unit 196. However, when the third data is stored in the first or second memory die 240A or 240B, the pairing operation unit 194 cannot expect an interleaving operation on the first and third data because the third data is transferred through the same channel as the first or second data. Therefore, the pairing operation unit 194 does not pair the read requests for the first or second data and the third data. At this time, the pairing operation unit 194 may check the physical address of the fourth data.

As described above, the pairing operation unit 194 checks the physical locations of data corresponding to read requests, and pairs the read requests and transfers the paired requests to the operation performance unit 196 when an interleaving operation can be expected. For this operation, the pairing operation unit 194 may refer to map information loaded to a memory or buffer which is included in the controller 130 or interconnected to the controller 130.

When the pairing operation unit 194 performs a pairing operation on a plurality of read requests, the pairing operation may have a bad influence on the data I/O throughput of the memory system 110. Therefore, the pairing operation unit 194 may not perform the pairing operation on all read requests transferred from the host or the external device. For example, the I/O buffer manager 198 may check data to be output from the output buffer 186 to the host or the external device, and control the pairing operation unit 194 to perform the pairing operation on the read requests, when it is determined that the pairing operation has no influence on the data I/O throughput of the memory system 110 even though the pairing operation unit 194 performs the pairing operation.

The pairing operation unit 194 may not pair all of the plurality of read requests transferred from the I/O buffer manager 198. When an interleaving operation for physical locations of data corresponding to a plurality of read requests is expected, the pairing operation unit 194 may pair the read requests. However, read requests which are not paired by the pairing operation unit 194 but remain may transferred to the operation performance unit 196 without a pairing operation.

The controller 130 may pair at least some of the plurality of read requests transferred from the host or the external device according to an operation environment, such that data can be transferred between the memory device 150 and the controller 130 through an interleaving operation. Furthermore, the memory system 110 does not need to employ the address limitation scheme in order to transfer data through an interleaving operation. The controller 130 may distribute and store data according to the operation environments and operation states of the plurality of memory dies 240A to 240D within the memory device 150, and try to pair read requests for the plurality of data. Therefore, since the memory system 110 does not employ the address limitation scheme, the plurality of memory dies 240A to 240D within the memory device 150 can be operated more efficiently, and the lifetimes of the plurality of memory dies 240A to 240D can be improved. On the other hand, since data can be transferred between the plurality of memory dies 240A to 240D and the controller 130 through an interleaving operation, the degradation in data I/O throughput of the memory system 110 can be prevented.

FIG. 2 illustrates a data processing system including a memory system according to an embodiment of the disclosure. Referring to FIG. 2, the data processing system 100 may include a host 102 engaged or operably coupled with a memory system 110.

The host 102 may include, for example, any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android, an iOS and a Windows mobile. The mobile operating system may be subject to support services or functions for mobility (e.g., a power saving function). The host 102 may include a plurality of operating systems. The host 102 may execute multiple operating systems in cooperation with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated to form an SSD for improving operation speed. When the memory system 110 is used as an SSD, the operating speed of the host 102 connected to the memory system 110 can be improved more than that of the host 102 connected with a hard disk. In another embodiment, the controller 130 and the memory device 150 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) circuitry 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC circuitry 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in a data read from the memory device 150 when the controller 130 reads the data stored in the memory device 150. In other words, after performing error correction decoding on the data read from the memory device 150, the ECC circuitry 138 may determine whether the error correction decoding has succeeded and output an instruction signal (e.g., a correction success signal or a correction fail signal). The ECC circuitry 138 may use the parity bit which is generated during the ECC encoding process, for correcting the error bit of the read data. When the number of the error bits is greater than or equal to a threshold number of correctable error bits, the ECC circuitry 138 may not correct error bits but instead may output an error correction fail signal indicating failure in correcting the error bits.

The ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC circuitry 138 may include any and all circuits, modules, systems or devices for performing the error correction operation based on at least one of the above described codes.

The PMU 140 may manage an electrical power provided in the controller 130. For example, the PMU 140 may detect the power-on 312 and the power-off 314 described in FIG. 1. In addition, the PMU 140 may include a power detector.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the memory 144 disposed within the controller 130, the present invention is not limited to that arrangement. That is, the memory 144 may be within or externally to the controller 130. For instance, the memory 144 may be embodied by an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache and a map buffer/cache.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may otherwise function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation as a command operation, corresponding to an command from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data in a memory block, among the memory blocks 152, 154, 156, and storing such data in another memory block (e.g., a garbage collection (GC) operation). The background operation may include an operation to move data stored in at least one of the memory blocks 152, 154, 156 in the memory device 150, into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternately, the controller 130 may determine which channel(s) or way(s) for connecting the controller 130 to which memory die(s) in the memory 150 is/are proper or appropriate for performing each operation. The controller 130 may send or transmit data or instructions via determined the channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through can be based on a physical block address, e.g., to which die(s) the instruction (and/or the data) is delivered. The controller 130 may refer to descriptors delivered from the memory device 150. The descriptors, which may have a set format or structure, may include a block or page of parameters that describe relevant characteristics about the memory device 150. For instance, the descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
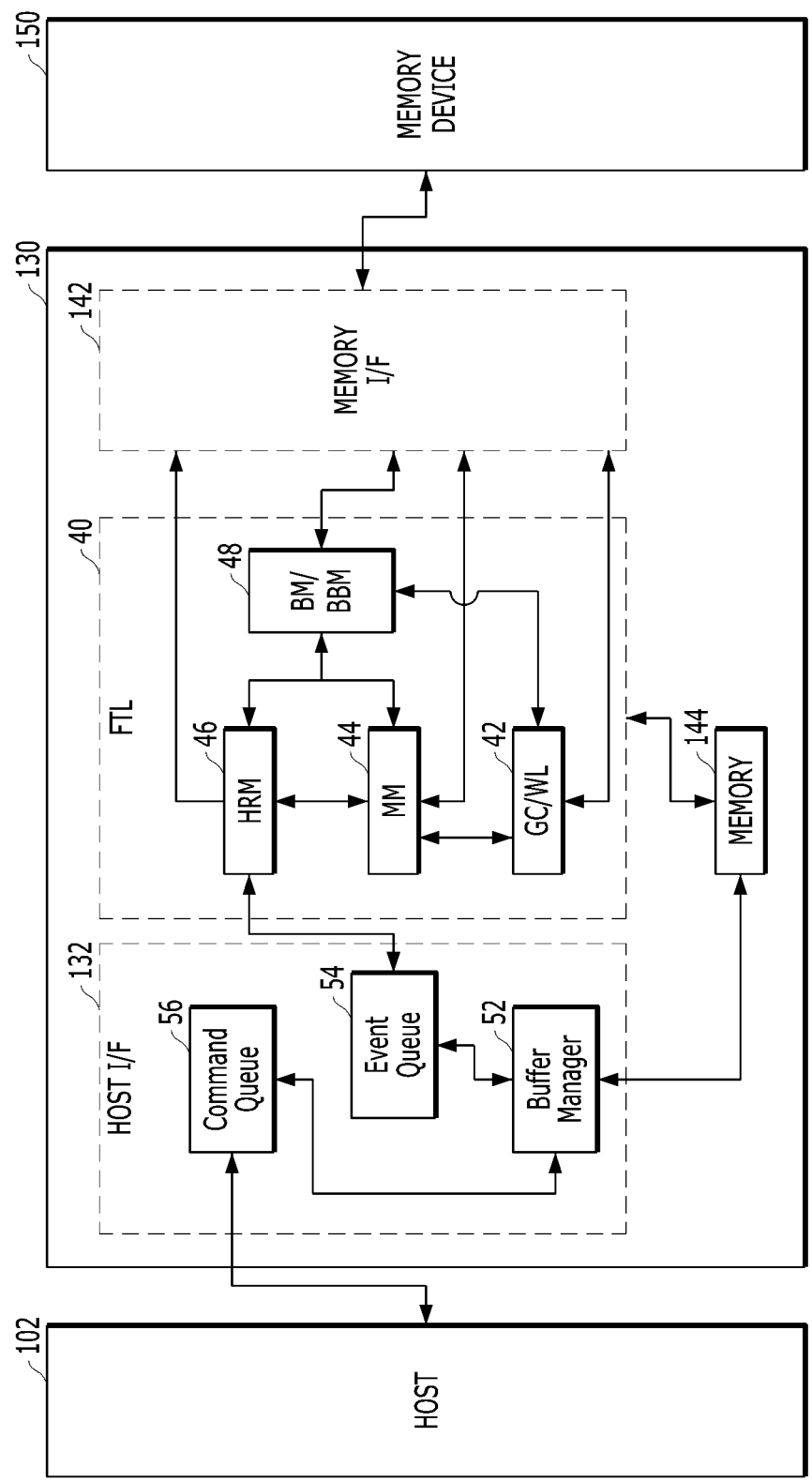
FIG. 3 illustrates a controller in a memory system according to an embodiment of the invention.

FIG. 3 illustrates a controller 130 in a memory system according to an embodiment of the disclosure. Referring to FIG. 3, the controller 130 cooperates with the host 102 and the memory device 150. The controller 130 may include a host interface (I/F) 132, a flash translation layer (FTL) circuitry 40, a memory interface (I/F) 142 and a memory 144.

Although not shown in FIG. 3, in accordance with an embodiment, the ECC circuitry 138 in FIG. 2 may be included in the flash translation layer (FTL) circuitry 40. In another embodiment, the ECC circuitry 138 may be implemented as a separate module, a circuit, or firmware, which is included in, or associated with, the controller 130.

The host interface 132 is for handling commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in a stored order. The buffer manager 52 may classify, manage or adjust the commands and the data, which are delivered from the command queue 56. The event queue 54 may sequentially transmit events for processing the commands and the data, from the buffer manager 52.

A plurality of commands or data of the same type may be continuously received from the host 102, or commands and data of different types may be transmitted to the memory system 110 after being mixed or jumbled. For example, a plurality of commands for reading data (i.e., read commands) may be delivered, or read commands and program/write commands may be alternately transmitted to the memory system 110. The host interface 132 may store commands and data, which are received from the host 102, to the command queue 56 sequentially. Thereafter, the host interface 132 may estimate or predict what kind of internal operation the controller 130 will perform according to the types of the commands and data received from the host 102. The host interface 132 may determine a processing order and a priority of commands and data, based at least on their types. According to the types of commands and data received from the host 102, the buffer manager 52 in the host interface 132 is configured to determine whether the buffer manager 52 should store commands and data in the memory 144, or whether the buffer manager 52 should deliver the commands and the data into the flash translation layer (FTL) circuitry 40. The event queue 54 receives events, entered from the buffer manager 52, which are to be internally executed and processed by the memory system 110 or the controller 130 in response to the commands and the data from the host 102, so as to deliver the events into the flash translation layer (FTL) circuitry 40 in the order received.

In accordance with an embodiment, the host interface 132 in FIG. 3 may perform the functions of the controller 130 in FIG. 1.

In accordance with an embodiment, the flash translation layer (FTL) circuitry 40 may include a state manager (GC/WL) 42, a map manager (MM) 44, a host request manager (HRM) 46, and a block manager (BM/BBM) 48. The host request manager 46 may manage the events in or received from the event queue 54. The map manager 44 may handle or control a map data. The state manager 42 may perform garbage collection (GC) or wear leveling (WL). The block manager 48 may execute commands or instructions on a block in the memory device 150.

By way of example but not limitation, the host request manager 46 may use the map manager 44 and the block manager 48 to handle or process requests according to the read and program commands, and events delivered from the host interface 132. The host request manager 46 may send an inquiry or request to the map data manager 44, to determine a physical address corresponding to the logical address which is entered with the events. The host request manager 46 may send a read request with the physical address to the memory interface 142, to process the read request (handle the events). On the other hand, the host request manager 46 may send a program request (or write request) to the block manager 48, to program entered data to an empty page (i.e., a page having no data) in the memory device 150, and then, may transmit a map update request corresponding to the program request to the map manager 44, to update an item relevant to the programmed data in information of mapping the logical-physical addresses to each other.

Here, the block manager 48 may convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks (i.e., empty blocks with no data). If the block manager 48 provides information regarding a block to be erased to the state manager 42, the state manager 42 is able to check all flash pages of the block to be erased to determine whether each page is valid. For example, to determine validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to the old physical address.

In accordance with an embodiment, the FTL circuitry 40 may include the correlation circuitry 194 shown in FIG. 1, and the memory interface 142 may include the operation control circuitry 196 and the buffer control circuitry 198 shown in FIG. 1. In another embodiment, the memory interface 142 includes the correlation circuitry 194, the operation control circuitry 196 and the buffer control circuitry 198 shown in FIG. 1.

The memory device 150 may include a plurality of memory blocks. Each of the plurality of memory blocks may be a single level cell (SLC) memory block or a multi level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block or a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. In another embodiment, the memory device 150 may be implemented by at least one of a phase change random access memory (PCRAM), a ferroelectrics random access memory (FRAM) and a spin injection magnetic memory (e.g., a spin transfer torque magnetic random access memory (STT-MRAM)).

Figure 4:
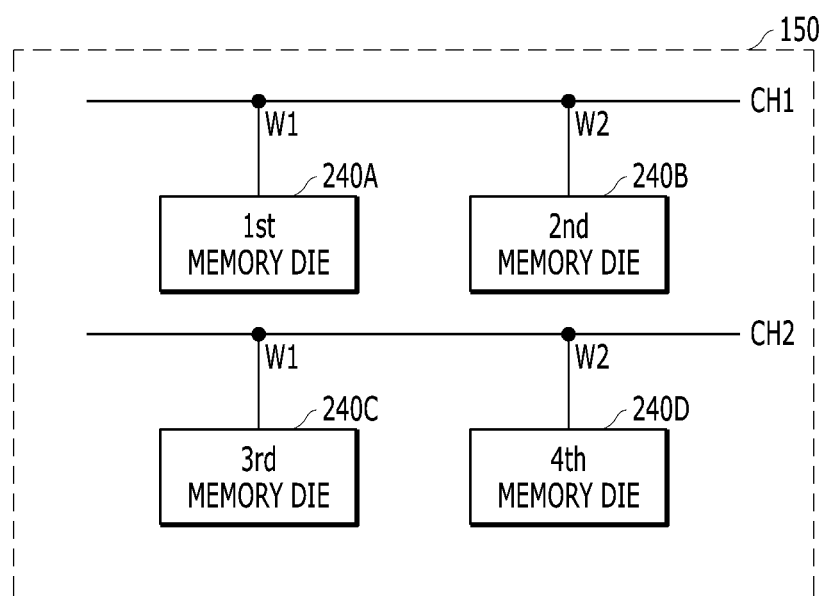
FIG. 4 illustrates a memory device in a memory system according to an embodiment of the invention.

FIG. 4 illustrates an internal configuration of the memory device 150.

Referring to FIG. 4, the memory device 150 may include the plurality of memory dies 240A to 240D. The first memory die 240A and the second memory die 240B may be coupled to the controller 130 (see FIGS. 1 to 3) through a first channel CH #1. The third memory die 240C and the fourth memory die 240D may be coupled to the controller 130 (see FIGS. 1 to 3) through a second channel CH #2.

FIG. 4 illustrates the configuration in which the four memory dies 240A to 240D are coupled to the controller 130 through the two channels CH #1 and CH #2. However, the memory device 150 may include various numbers of memory dies, such as two or eight memory dies, and the number of channels included may also vary; there may be 2, 3, 4 or 5 channels. The number of memory dies within the memory device 150 and the number of channels may be changed according to the purpose of use and the performance requirement of the memory system 110 (see FIGS. 1 to 3).

When a plurality of memory dies are coupled to one channel, each of the memory dies may be coupled to the channel through a way. Referring to FIG. 4, the first memory die 240A and the second memory die 240B may be coupled to the first channel CH #1 through a first way W1 and a second way W2, respectively. The third memory die 240C and the fourth memory die 240D may be coupled to the second channel CH #2 through the first way W1 and the second way W2, respectively. The number of ways may be decided depending on how many memory dies are coupled to each of the channels.

Figure 5A:
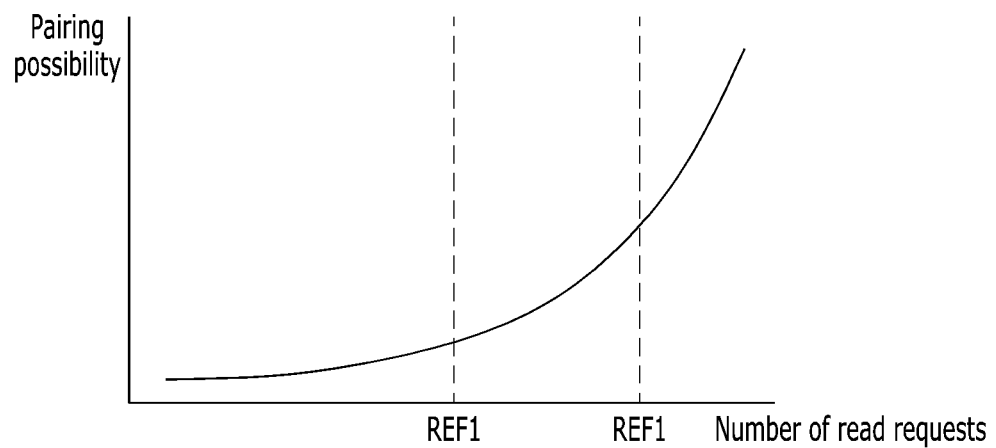
FIGS. 5A and 5B illustrate characteristics of a correlation operation performed by a controller according to an embodiment of the invention.
Figure 5B:
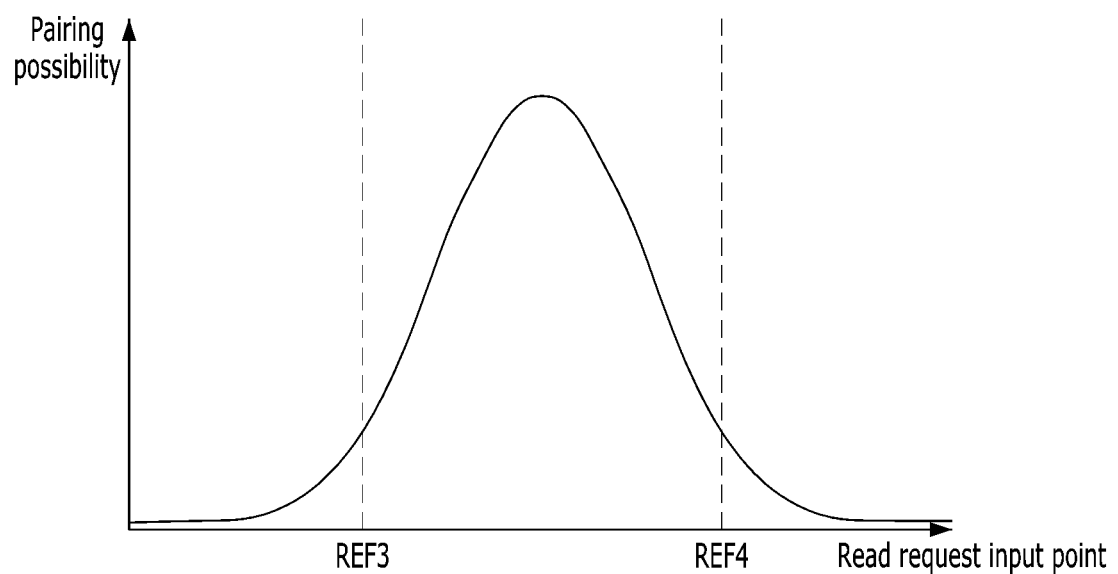

FIGS. 5A and 5B illustrate the characteristics of the pairing operation performed by the controller. Specifically, FIGS. 5A and 5B do not illustrate pairing possibility related to read requests in a limited specific situation, but illustrate results which can be obtained when unspecific and random situations are repeated.

FIG. 5A illustrates that the pairing possibility may increase with the increase in the number of read requests on which the pairing operation unit 194 within the controller 130 performs a pairing operation. For example, the possibility that read requests will be paired through a pairing operation for 20 read requests is higher than the possibility that read requests will be paired through a pairing operation for five read requests.

When there is no address limitation, physical locations within the memory device 150 (see FIGS. 1 to 4), corresponding to logical addresses transferred with a plurality of read requests, may not be distributed in some cases. In this case, a smaller number of read requests may be paired through the pairing operation unit 194. However, as the number of read requests transferred to the memory system 110 increases, the possibility that read requests will be paired may increase. For example, the pairing possibility when the number of read requests is equal to a second reference value REF2 is higher than when the number of read requests is equal to a first reference value REF1.

FIG. 5B illustrates the pairing possibility depending on the times at which a plurality of read requests are sequentially transferred to the pairing operation unit 194. As described with reference to FIG. 4, it is assumed that there are two channels between the controller 130 and the memory device 150 within the memory system 110. For example, a first read request transferred to the pairing operation unit 194 cannot be paired because there is no read request to be paired. When a second read request is transferred to the pairing operation unit 194, the second read request may be paired with the first read request or not. When a third read request is transferred to the pairing operation unit 194, the pairing operation unit 194 may try to pair the third read request with the first or second read request. Therefore, the pairing possibility when the third read request is transferred may be higher than when the second read request is transferred. Based on such characteristics, the pairing operation unit 194 may distinguish between before and after the third read request is transferred, and not try a pairing operation before the third read request is transferred as that is when the pairing possibility is low, but try a pairing operation after the third read request is transferred as that is when the pairing possibility is high.

Furthermore, suppose that 20 read requests are transferred. The pairing possibility when 19th and 20th read requests among the 20 read requests are inputted may be lower than when ninth to 11th read requests are inputted. That is because, when most of the plurality of read requests have already been inputted, many have also already been paired. At a time after read requests are input, the pairing possibility may decrease as many of those read requests become paired thus decreasing the possibility that new read requests that are input will be paired. When a new read request is not transferred after the pairing possibility decreases, the pairing possibility is difficult to increase again. In order to avoid unnecessarily expending resources and time on the pairing operation when the pairing possibility is low, the pairing operation unit 194 may stop the pairing operation when the fourth read request is transferred.

In an embodiment, the pairing operation unit 194 may stop the pairing operation in response to the number of read requests which are not paired. When there remain two or three read requests which are not paired among the transferred 20 read requests, the pairing operation unit 194 may not hold the corresponding read requests for the pairing operation, but output the read requests to the operation performance unit 196. When the pairing operation unit 194 holds a small number of read requests in order to perform a pairing operation on the corresponding read requests, the holding operation may degrade the data I/O throughput of the memory system 110.

Figure 6:
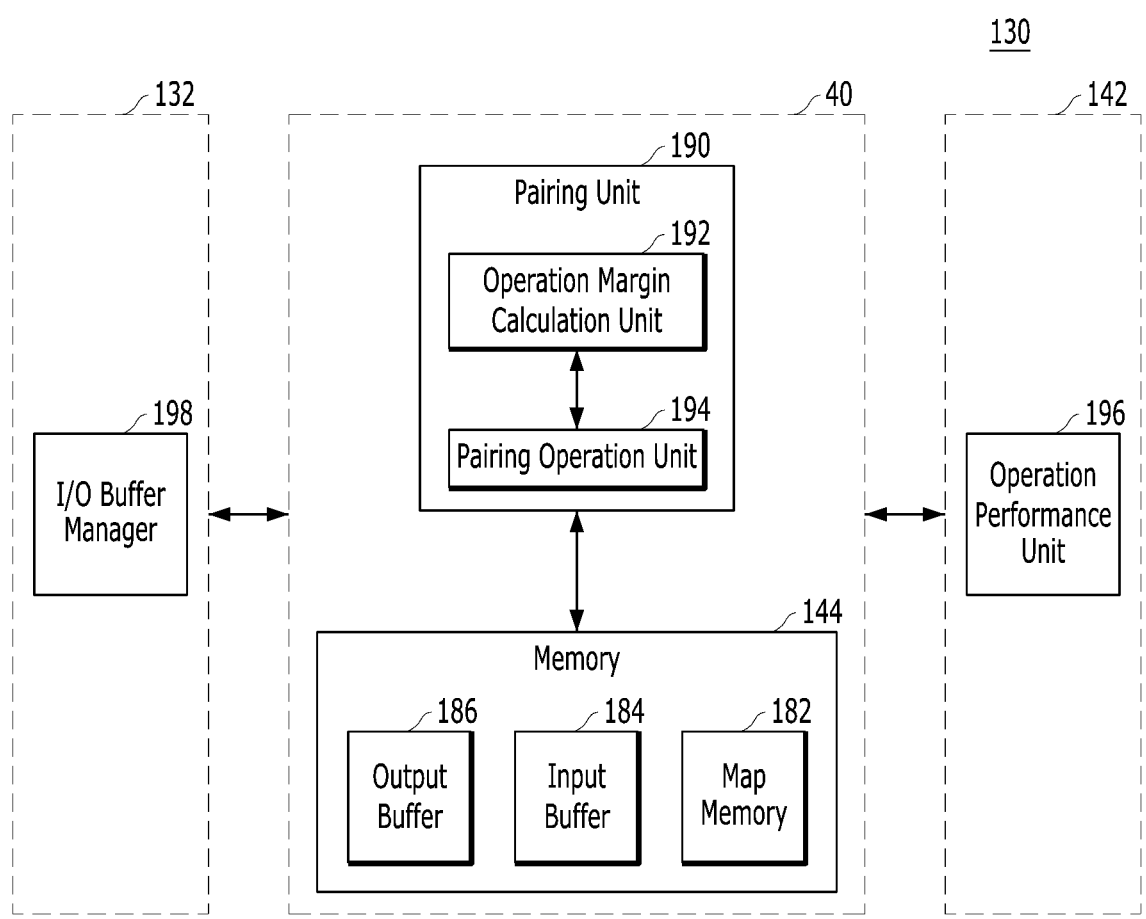
FIG. 6 illustrates an internal configuration of a controller in accordance with an embodiment of the invention.

FIG. 6 illustrates an internal configuration of the controller 130 in accordance with an embodiment of the present invention.

Referring to FIG. 6, the controller 130 may include a host interface 132, an FTL (Flash Translation Layer) 40 and a memory interface 142. The FTL 40 may include memory 144 and a pairing unit 190. Since the host interface 132, the memory interface 142 and the pairing unit 190 have been described in detail with reference to FIGS. 1 to 3, detailed description thereof is omitted here. The memory 144 may include the output buffer 186, the input buffer 184 and a map memory 182. In an embodiment, the output buffer 186, the input buffer 184 and the map memory 182 may be implemented in the memory 144 described with reference to FIGS. 2 and 3. In an embodiment, the output buffer 186, the input buffer 184 and the map memory 182 may be implemented as a plurality of nonvolatile memory devices or a plurality of cache memories. For example, the output buffer 186 and the input buffer 184 may have the same data structure as a queue. In this case, the output buffer 186 and the input buffer 184 may output data according to the order in which the data are stored (FIFO). The map memory 182 may have various structures depending on the storage and management policy of map data and map information.

The controller 130 may translate a logical address, transferred from an external device or the host 102 into a physical address indicating a physical location within the memory device 150. For the address translation, the controller 130 may load the map data and map information stored in the memory device 150.

In an embodiment, when the memory 144 in (or connected to) the controller 130 has sufficient storage space, all of the map data and map information used for the address translation may be fetched at one time. However, in the case of the memory system 110 mounted in a mobile terminal or the like, the controller 130 may not have enough storage space to store all of the map data and map information. In this case, the controller 130 may utilize the space of the memory 144, in which the map data and map information are stored, through a process of fetching specific map information from the memory device 150, using or updating the map information, storing the map information in the memory device 150, and fetching another piece of map information stored in the memory device 150.

When requested map data cannot be stored in a region within the memory 144, the controller 130 may remove the least recently used, or the least frequently used, map data in the corresponding region. When the controller 130 requests map data and map information for address translation from the memory device 150, that operation is overhead for memory system 110 and thus impacts the overall performance or I/O throughput of the memory system 110. Therefore, the controller 130 needs to be controlled not to request unnecessary map data and map information. For example, suppose that there are 20 read requests to be paired. As a result of checking the map memory 182 based on logical addresses associated with the 20 read requests, map data and map addresses for 11 read requests may be stored in the map memory 182, and map data and map addresses for 9 read requests may not be stored in the map memory 182. In this case, the controller 130 may load the map data and map addresses for the 9 read requests to the map memory 182. In an embodiment, when the storage space of the map memory 182 is not enough, the pairing unit 190 within the controller 130 may preferentially perform a pairing operation on read requests whose map addresses can be checked. Here, the controller 130 requires a sufficient operation margin for performing the pairing operation. To determine the operation margin, the operation margin calculation unit 192 may calculate the time it takes to output plural pieces of data stored in the output buffer to the host or the external device (data processing time), using the attribute information of valid clusters in the output buffer 186. Based on the data processing time, the operation margin calculation unit 192 may decide the operation margin for performing the pairing operation. Before the operation margin calculation unit 192 is described in detail, attribute information corresponding to a plurality of clusters included in the output buffer 186 is described with reference to FIG. 7.

FIG. 7 illustrates attribute information on the plurality of clusters within the buffer in accordance with an embodiment of the present invention. Referring to FIG. 7, the output buffer 186 may include the plurality of clusters. Here, a cluster refers to a unit of a region within the output buffer 186. Data stored or to be stored in the output buffer 186 may be managed in units of clusters. A size of the cluster may depend on the data structure or the like. The plurality of clusters may include free clusters and valid clusters. The free clusters are empty regions where no data is stored and thus are available for storing data by an operation of the memory system. All other (non-free clusters) are valid clusters, and thus may be currently buffering data to be outputted to the host. The valid clusters may be allocated to store data in response to read requests. The plurality of clusters may include attribute information corresponding to the respective clusters. The attribute information on the clusters may include index information (Index #) for identifying the plurality of clusters, data information (DATA #) stored in the output buffer 186 for read requests in response to the respective pieces of index information, control information (Control Information) on control units which have processed data and stored the data in the output buffer 186, task information (Task ID) indicating the request types of the data, and flag information (Flag) for determining whether data is currently stored in a valid cluster and ready to be outputted to the host or the external device. First, the plurality of clusters may include zeroth to $(N-1)^{th}$ clusters. The zeroth to $(N-1)^{th}$ clusters may correspond to the identification information of the indexes Index 0 to Index N-1, respectively, for identification. Here, the zeroth to fourth clusters may be valid clusters, and the fifth to $(N-1)^{th}$ clusters may be free clusters. The control information (Control Information) indicates information on a control unit which is included in the controller and has processed data in response to a read request. There may be multiple control units including a first control unit, a second control unit and a third control unit. The first control unit may include the FTL, the second control unit may include the memory interface unit, and the third control unit may include the host interface unit. When data is processed by the first control unit, first identification information is stored as the control information of the valid cluster. When data is processed by the second control unit, second identification information is stored as the control information of the valid cluster. When data is processed by the third control unit, third identification information is stored as the control information of the valid cluster. The data are processed in the order of the first to third control units. That is, the data may be processed in the order of the first to third control units, and then outputted to the host or the external device. Specifically, when the control information is the first identification information, it indicates that data is being controlled by the first control unit. That is, the control information may indicate that one of the free clusters within the output buffer 186 is allocated by the FTL (i.e., the first control unit) as a valid cluster to temporarily store the data, in response to a read request transferred from the external device. FIG. 7 exemplifies that the data corresponding to the read request is not yet stored in the corresponding valid cluster. When the control information is the second identification information, it indicates that data is being controlled by the second control unit. That is, the control information may indicate that the second control unit is reading data and storing the read data in the valid cluster of the output buffer 186, allocated by the first control unit, after checking a physical location for the corresponding logical address within the plurality of memory dies, or the data is stored in the valid cluster. When the control information is the third identification information, it indicates that data is being controlled by the third control unit. That is, the control information indicates that the data stored in the valid cluster is being outputted to the host or the external device by the third control unit. Here, the control information may be retained as the third identification information until the data stored in the valid cluster is removed after the data stored in the valid cluster is outputted to the host or the external device by the third control unit. The task information (Task ID) indicating the request type of data is information for determining whether the data stored in each of the valid clusters is data to be outputted to the host or the external device in response to a read request transferred from the host or data to be outputted to the inside of the memory system by a background operation. For convenience of description, the data to be outputted to the host or the external device may be denoted by 'A', and the data to be outputted to the inside of the memory device may be denoted by 'B'. The flag information (Flag) is information for determining whether data is currently stored in a valid cluster and ready to be outputted to the host or the external device. When data is stored in the valid cluster, the flag information may be represented by '1'. When a read operation is performed by the first or second control unit in response to a read request, the flag information may be represented by '0' because no data is stored in the valid cluster. For the zeroth valid cluster, the zeroth valid cluster stores first data DATA1 therein and is controlled by the third control unit, the task information (Task ID) is set to A indicating that the first data is data to be outputted to the host or the external device, and the flag information (Flag) is set to 1 indicating that the data is stored in the valid cluster. For the first valid cluster, the first valid cluster stores second data DATA2 therein and is controlled by the second control unit, the task information (Task ID) is set to A indicating that the second data is data to be outputted to the host or the external device, and the flag information (Flag) is set to 1 indicating that the data is stored in the valid cluster. For the second valid cluster, the second valid cluster stores third data DATA3 therein and is controlled by the second control unit, the task information (Task ID) is set to B indicating that the third data is data for a background operation, and the flag information (Flag) is set to 1 indicating that the data is stored in the valid cluster. For the third valid cluster, the third valid cluster stores no data therein and is controlled by the first control unit, the task information (Task ID) is set to A indicating that data to be stored in the third valid cluster in the future is data to be outputted to the host or the external device, and the flag information (Flag) is set to 0 indicating that no data is stored in the third valid cluster. For the fourth valid cluster, the fourth valid cluster stores no data therein and is controlled by the first control unit, the task information (Task ID) is set to A indicating that data to be stored in the fourth valid cluster in the future is data to be outputted to the host or the external device, and the flag information (Flag) is set to 0 indicating that no data is stored in the fourth valid cluster.

Referring back to FIG. 6, the operation margin calculation unit 192 may calculate the data processing time based on the attribute information of the respective valid clusters within the output buffer 186. As such, the operation margin calculation unit 192 may calculate the data processing time it takes to output data from the valid clusters to the host or the external device, using the control information (Control information) and the task information (Task ID) which are the attribute information corresponding to the respective valid clusters. The data processing time may be calculated through thee kinds of methods. According to the first method, the operation margin calculation unit 192 may calculate the data processing time based on the control information corresponding to the plurality of clusters included in the output buffer 186. According to the second method, the operation margin calculation unit 192 may calculate the data processing time based on the task information corresponding to the plurality of clusters included in the output buffer 186. According to the third method, the operation margin calculation unit 192 may calculate the data processing time based on the control information and the task information which correspond to the plurality of clusters.

First, the first method in which the operation margin calculation unit 192 calculates the data processing time based on the control information will be described. The operation margin calculation unit 192 may count the number of valid clusters in the output buffer 186. The valid clusters in the output buffer 186 indicate the clusters other than the free clusters among the plurality of clusters. The reason to count the number of valid clusters is because, when a pairing operation is performed on a plurality of read requests and logical addresses corresponding to the read requests in the input buffer 184 without considering the number of pieces of data to be outputted to the host or the external device from the output buffer 186, the data I/O throughput of the memory system 110 may be degraded. The operation margin calculation unit 192 may compare the number of valid clusters within the buffer to a first threshold value TH1.

When the comparison result indicates that the number of valid clusters is equal to or more than the first threshold value TH1 (YES), the operation margin calculation unit 192 may check the control information for controlling the respective valid clusters. The operation margin calculation unit 192 may calculate data processing time until data buffered in the respective valid clusters is outputted to the host or the external device, based on the control information corresponding to the valid cluster. That is, through the control information corresponding to each of the valid clusters, the operation margin calculation unit 192 may calculate the data processing time by reflecting internal operation time until the data buffered in the respective valid clusters is outputted to the external device. The internal operation time may include first processing time for transferring data from the first control unit to the second control unit, second processing time for transferring data from the second control unit to the third control unit, and third processing time for outputting data from the third control unit to the external device. For example, referring to FIG. 7 the control information corresponding to the zeroth valid cluster is the third identification information, and the third processing time may be the time it takes until the data stored in the zeroth valid cluster is outputted to the host or the external device. The control information corresponding to the first valid cluster is the second identification information, and the second processing time and the third processing time may be the time it takes until the data stored in the first valid cluster is outputted to the host or the external device. The control information corresponding to the second valid cluster is the second identification information, and the second processing time and the third processing time may be the time it takes until the data stored in the second valid cluster is outputted to the host or the external device. The control information corresponding to the third valid cluster is the first identification information, and the first processing time, the second processing time and the third processing time may be the time it takes until the data stored in the third valid cluster is outputted to the host or the external device. The control information corresponding to the fourth valid cluster is the first identification information, and the first processing time, the second processing time and the third processing time may be the time it takes until the data stored in the fourth valid cluster is outputted to the host or the external device. The data processing time calculated through the control information corresponding to each of the valid clusters has a value obtained by excluding an overlapped time, because the first to third control units process the data buffered in the respective valid clusters in parallel. Therefore, the data processing time may be decided based on the data that is to be processed last to be outputted to the external device, among the data buffered in the valid clusters. That is, the operation margin calculation unit 192 may calculate the data processing time by subtracting 1 from the number of valid clusters, multiplying the subtraction result value by the second processing time, and adding the total operation margin to the multiplication result value, the total operation margin being calculated based on the control information of the data to be output last from the valid clusters to the external device. The reason to multiply the second processing time is because the valid cluster with the second identification information corresponding to the previous stage of the third identification information waits like a bottleneck phenomenon. By calculating the data processing time by reflecting the control information corresponding to the valid clusters, the operation margin calculation unit 192 may calculate a minimum operation margin for avoiding latency caused by a pairing operation when one or more read requests among the plurality of read requests are performed.

On the other hand, when the comparison result indicates that the number of valid clusters is less than the first threshold value TH1 (NO), the operation margin calculation unit 192 does not calculate data processing time for deciding an operation margin for performing a pairing operation, and the pairing operation unit 194 performs read operations through read requests which are stored in the input buffer 184 up to now and logical addresses corresponding to the read requests. That is, the pairing operation unit 194 does not perform the pairing operation until the number of pieces of data temporarily stored in the output buffer 186 is equal to or more than the first threshold value, but performs the reads operations in response to the read requests.

According to the second method in which the operation margin calculation unit 192 calculates the data processing time based on the task information (Task ID), the operation margin calculation unit 192 may check the number of valid clusters Valid Cluster_OUT buffering data to be outputted to the host or the external device, based on the information of the valid clusters within the output buffer 186. For example, referring to FIG. 7, the operation margin calculation unit 192 calculates the number of valid clusters whose Task ID is 'A', among the plurality of valid clusters. The check result shows that the number of valid clusters buffering data to be outputted (Valid Cluster_OUT) to the host or the external device is four, i.e., clusters corresponding to Indices 0, 1, 3 and 4. Then, the operation margin calculation unit 192 checks whether the number of valid clusters buffering data to be outputted is equal to or more than a second threshold value TH2. When the check result indicates that the number of valid clusters buffering data to be outputted is equal to or more than the second threshold value TH2 (YES), the operation margin calculation unit 192 calculates the data processing time based on the number of valid clusters buffering data to be outputted. On the other hand, when the number of valid clusters buffering data to be outputted is less than the second threshold value TH2 (NO), the operation margin calculation unit 192 does not calculate the data processing time for deciding the operation margin for performing the pairing operation, and the pairing operation unit 194 performs read operations through read requests which are stored in the input buffer 184 up to now and logical addresses corresponding to the read requests. That is, the pairing operation unit 194 does not perform the pairing operation until the number of pieces of data temporarily stored in the output buffer 186 is equal to or more than the second threshold value, but performs the read operations in response to the read requests.

According to the third method in which the operation margin calculation unit 192 calculates the data processing time based on the task information and the control information corresponding to the plurality of clusters, the operation margin calculation unit 192 checks the number of valid clusters buffering data to be outputted to the host or external device, based on the task information of the valid clusters within the output buffer 186. Since this operation has been described in the second method, the detailed descriptions thereof are omitted herein. The operation margin calculation unit 192 compares the number of valid clusters Valid Cluster_OUT buffering data to be outputted to the host or the external device with a third threshold value TH3. When the comparison result indicates that the number of valid clusters buffering data to be outputted to the host or the external device is equal to or more than the third threshold value TH3 (YES), the operation margin calculation unit 192 may check the control information for controlling the valid clusters buffering data to be outputted to the host or the external device, and calculate the data processing time it takes until the data buffered in the respective valid clusters is outputted to the host or the external device, based on the checked control information of the respective valid clusters. Since this operation has been described in the first method, the detailed descriptions thereof are omitted herein. On the other hand, when the comparison result indicates that the number of valid clusters buffering data to be outputted to the host or the external device is less than the third threshold value TH3 (NO), the operation margin calculation unit 192 does not calculate the data processing time for deciding the operation margin for performing the pairing operation, and the pairing operation unit 194 performs read operations through read requests which are stored in the input buffer 184 up to now and logical addresses corresponding to the read requests. That is, the pairing operation unit 194 does not perform the pairing operation until the number of pieces of data temporarily stored in the output buffer 186 is equal to or more than the third threshold value, but performs the read operations in response to the read requests.

Figure 8:
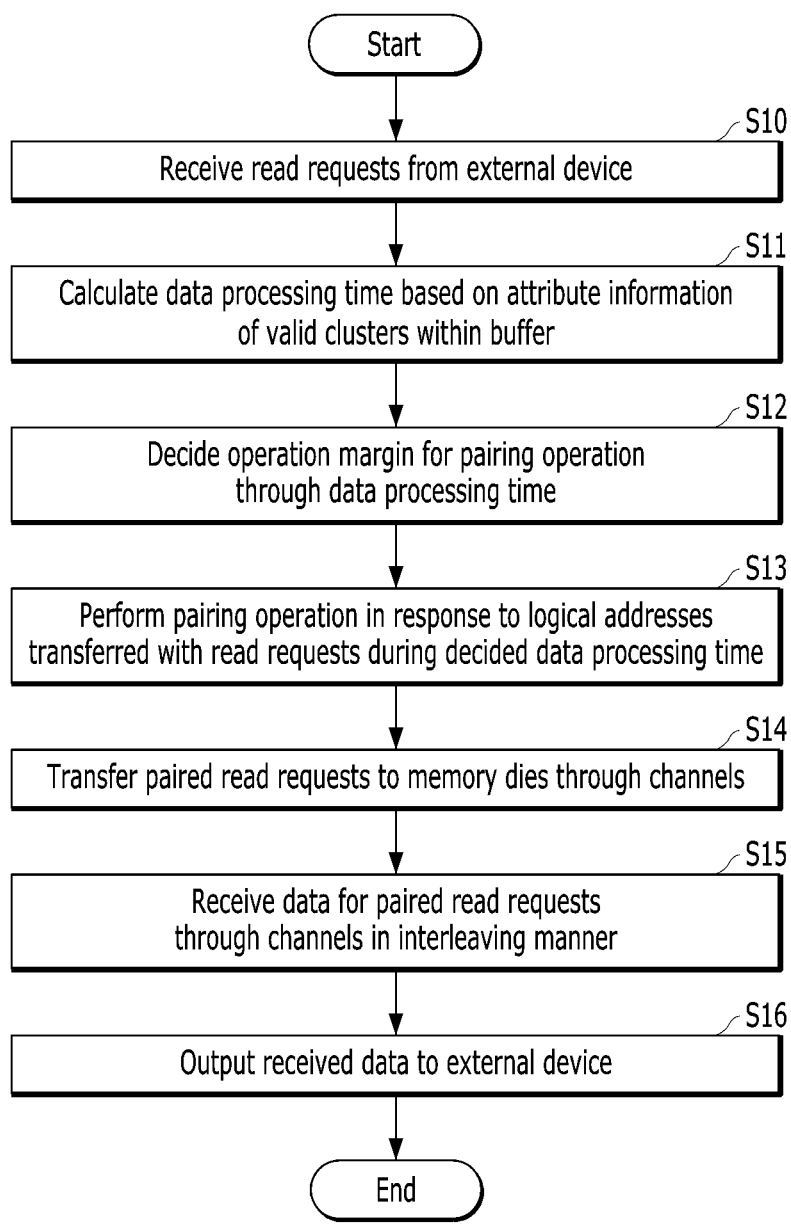
FIG. 8 is a flowchart for describing an operating method of a memory system in accordance with an embodiment of the invention.

FIG. 8 is a flowchart for describing an operating method of a memory system in accordance with an embodiment.

Referring to FIG. 8, the operating method of the memory system may include step S10 of receiving a plurality of read requests transferred from an external device, step S11 of calculating data processing time based on attribute information of valid clusters within the output buffer 186, each valid cluster currently buffering data, step S12 of deciding, based on the data processing time, an operation margin for performing a pairing operation, step S13 of performing a pairing operation according to logical addresses transferred with the plurality of read requests during the decided operation margin, step S14 of transferring the paired read requests to a plurality of memory dies through a plurality of channels, step S15 of receiving data corresponding to the paired read requests from the memory dies in an interleaving manner through the plurality of channels, and step S16 of outputting the received data to the external device or a host.

Although not illustrated, the operating method of the memory system may further include a step of sequentially translating addresses for unpaired read requests and transferring the translated addresses to the plurality of memory dies, and a step of receiving data corresponding to the unpaired read requests from the plurality of memory dies. For example, the memory system may not perform the read requests according to the order in which the read requests are inputted, but decide the order to perform the read requests, depending on whether the read requests are paired. The memory system 110 may first perform the paired read requests, and then perform the unpaired read requests.

In step S12, the controller may calculate the data processing time based on the attribute information of the respective valid clusters within the output buffer 186. As such, the controller may calculate the data processing time it takes until read data corresponding to read requests transferred from the host or the external device are outputted to the host or the external device, using the control information and the task information which are the attribute information corresponding to the respective valid clusters. This process is described in detail with reference to FIGS. 9 to 11.

In step S12, the controller may decide the operation margin for performing the pairing operation through the calculated data processing time. That is, the controller may calculate a first data I/O time between the host or the external device and the memory system and a second data I/O time between the controller and the plurality of memory dies. Through this operation, the controller may decide the operation margin for trying the pairing operation by excluding the firs data I/O time and the second data I/O time from the data processing time.

In step S13, the controller may perform the pairing operation in response to the logical addresses transferred with the plurality of read requests during the decided operation margin. That is, the controller may perform the pairing operation according to the order in which the plurality of read requests are transferred, during the decided operation margin for trying the pairing operation. The controller may transfer the paired read requests before the unpaired read requests, thereby improving the I/O throughput of the memory system 110. In order to avoid the degradation in I/O throughput of the memory system, the controller may not try a pairing operation on some of the plurality of read requests. For example, when the module for performing the address translation is in an idle state, the controller may not try a pairing operation on the first or second read request.

When map data associated with the logical addresses included in the respective read requests are not stored in a region within the cache memory or the volatile memory, the operating method may include a step of requesting the corresponding map data from the plurality of memory dies. When a cache memory or a volatile memory does not have a space enough to store the map data, the controller may load necessary map data, and program unnecessary map data to the memory device. For example, when the requested map data cannot be stored in the region, the controller may remove the least recently used map data in the region. In an embodiment, when the requested map data cannot be stored in the region, the controller may remove the least frequently used map data in the region.

In step S14, the controller may perform address translation on the paired read requests, and transfer the read requests to the plurality of memory dies through the plurality of channels. That is, the controller may perform address translation on the read requests according to the execution order changed by the pairing operation. The controller may translate the logical addresses transferred with the paired read requests into physical locations where data are stored, using the map data and map information loaded to the map memory 182, and transfer the corresponding read requests to the memory device 150 (see FIGS. 1 to 4).

In step S15, the controller may receive data for the paired read requests in an interleaving manner through the plurality of channels. That is, the controller may control each of the memory dies to output data in response to the read request transferred to the corresponding memory die. In response to the read requests transferred to the respective memory dies, the memory dies may output data. The read requests transferred to the respective memory dies may be transferred to sequentially use the channels, and the data outputted from the memory dies may also sequentially use the channels.

In step S16, the controller 130 may receive the data through the plurality of channels, and output the received data to the external device or the host. The controller 130 may temporarily store the received data in the output buffer 186, and the output buffer 186 may output the data to the external device or the host in the order in which the data are stored.

Figure 9:
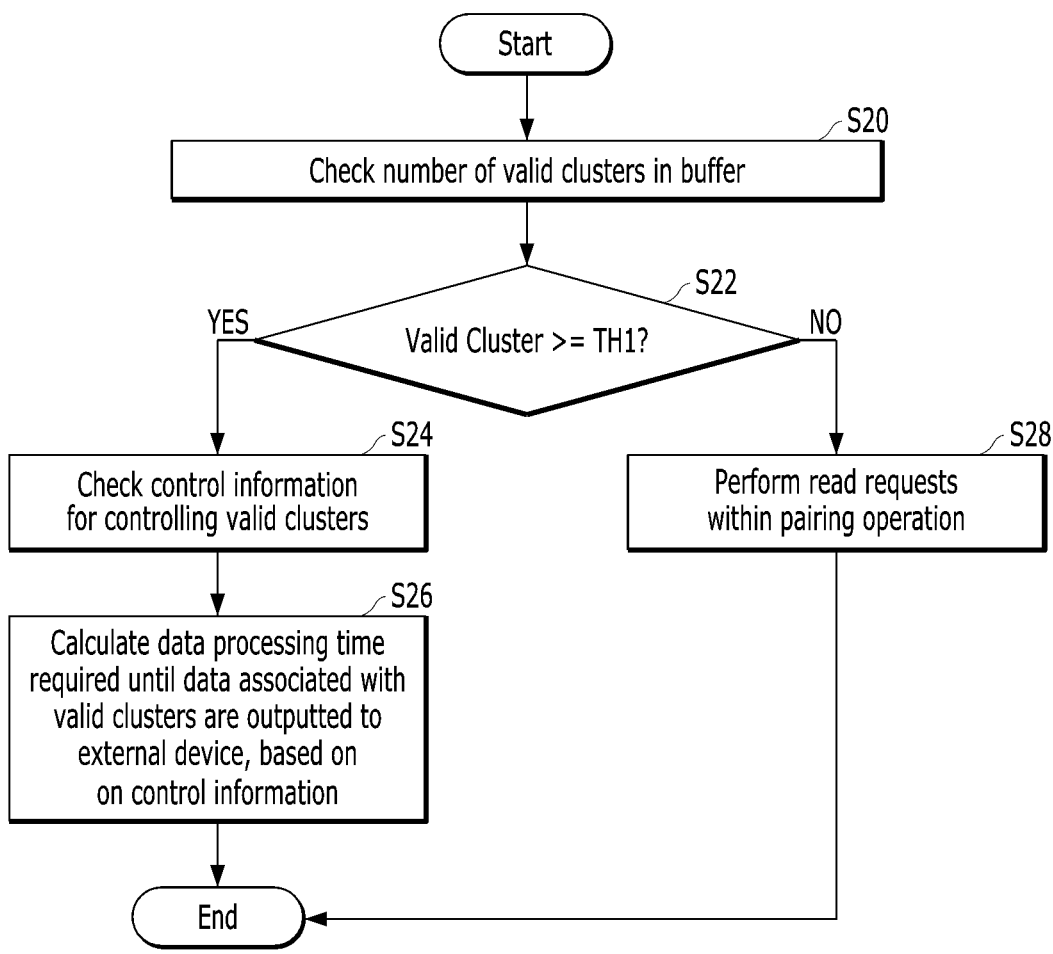
FIG. 9 is a flowchart illustrating a first embodiment in which the controller calculates data processing time.

FIG. 9 is a flowchart illustrating a first embodiment in which the controller calculates data processing time. FIG. 9 is a flowchart for describing the details of step S11 of calculating the data processing time based on the attribute information of the respective valid clusters within the output buffer 186 in FIG. 8. The method of deciding data processing time in accordance with the first embodiment may be performed by the operation margin calculation unit 192 (see FIGS. 1 and 6) within the controller 130.

Referring to FIG. 9, the method may include step S20 of checking the number of valid clusters within the output buffer 186, step S22 of comparing the number of the valid clusters to the first threshold value TH1, step S24 of checking control information for controlling the valid clusters when the comparison result indicates that the number of valid clusters is equal to or more than the first threshold value TH1 (YES), step S26 of calculating data processing time it takes until data associated with the valid clusters are outputted to the host or the external device, based on the control information of the valid clusters, and step S28 of performing the read requests without a pairing operation, when the comparison result indicates that the number of valid clusters is less than the first threshold value TH1 (NO).

Specifically, referring to FIG. 9, the controller may count the number of valid clusters within the output buffer 186 in step S20. The valid clusters in the output buffer 186 are clusters other than free clusters among the plurality of clusters. The reason to count the number of valid clusters is because, when a pairing operation is performed on the plurality of read requests and logical addresses corresponding to the read requests in the input buffer 184 without considering the number of pieces of data to be outputted to the host or the external device from the output buffer 186, the data I/O throughput of the memory system 110 may be degraded.

In step S22, the controller may compare the number of valid clusters within the buffer to the first threshold value TH1. When the comparison result indicates that the number of valid clusters is equal to or more than the first threshold value TH1 (YES), the controller may check the control information for controlling the respective valid clusters in step S24.

In step S26, the controller may calculate the data processing time required until the data associated with the respective valid clusters are outputted to the host or the external device, based on the control information corresponding to the valid clusters. That is, through the control information corresponding to the respective valid clusters, the controller may calculate the data processing time by reflecting internal operation time required until the data associated with the respective valid clusters are outputted to the external device. The internal operation time may include first processing time for transferring data from the first control unit to the second control unit, second processing time for transferring data from the second control unit to the third control unit, and third processing time for outputting data from the third control unit to the external device. For example, referring to FIG. 7 showing the control information corresponding to the respective valid clusters, the control information corresponding to the zeroth valid cluster is the third identification information, and the third processing time may be the time it takes until the data stored in the zeroth valid cluster is outputted to the host or the external device.

The control information corresponding to the first valid cluster is the second identification information, and the second processing time and the third processing time may be the time it takes until the data stored in the first valid cluster is outputted to the host or the external device.

The control information corresponding to the second valid cluster is the second identification information, and the second processing time and the third processing time may be the time it takes until the data stored in the second valid cluster is outputted to the host or the external device.

The control information corresponding to the third valid cluster is the first identification information, and the first processing time, and the second processing time and the third processing time may be the time it takes until the data stored in the third valid cluster is outputted to the host or the external device.

The control information corresponding to the fourth valid cluster is the first identification information, and the first processing time, the second processing time and the third processing time may be the time it takes until the data stored in the fourth valid cluster is outputted to the host or the external device.

The data processing time calculated through the control information corresponding to each of the valid clusters has a value obtained by excluding an overlapped time, because the first to third control units for controlling the data associated with the respective valid clusters are operated in parallel.

Therefore, the controller may decide the data processing time, based on the data to be output last from the valid clusters to the external device, among the data associated with the valid clusters. That is, the controller may calculate the data processing time by subtracting 1 from the number of valid clusters, multiplying the subtraction result value by the second processing time, and adding the total operation margin to the multiplication result value, the total operation margin being calculated based on the control information of the data to be output last from the valid clusters to the external device.

The reason to multiply by the second processing time is because the valid cluster with the second identification information corresponding to the previous stage of the third identification information waits like a bottleneck phenomenon.

By calculating the data processing time by reflecting the control information corresponding to the valid clusters, the controller may calculate a minimum operation margin for avoiding latency caused by the pairing operation when one or more read requests among the plurality of read requests are performed.

On the other hand, when the comparison result of step S22 indicates that the number of valid clusters is less than the first threshold value TH1 (NO), the controller does not perform a pairing operation, but performs read operations through the read requests which are stored in the input buffer 184 up to now and the logical addresses corresponding to the read requests. That is, the controller does not perform the pairing operation until the number of pieces of data temporarily stored in the output buffer 186 is equal to or more than the first threshold value, but performs the read operations in response to the read requests.

Figure 10:
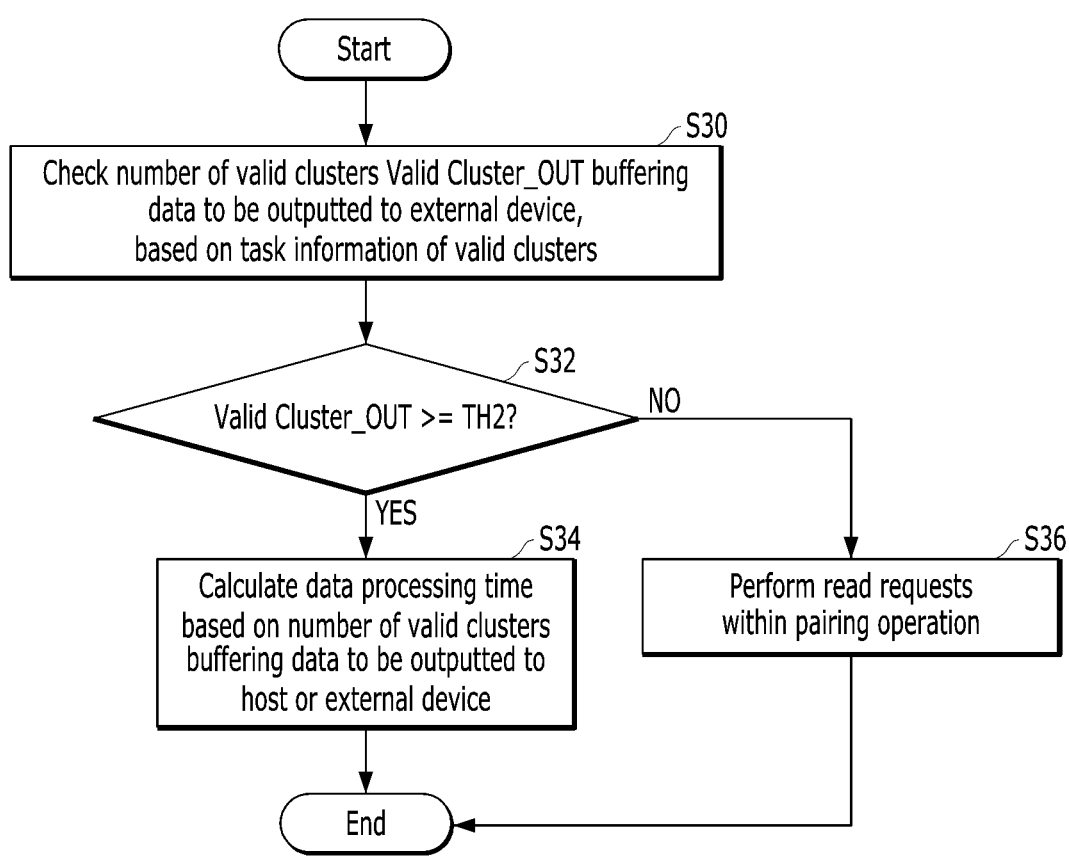
FIG. 10 is a flowchart illustrating a second embodiment in which the controller calculates data processing time.

FIG. 10 is a flowchart illustrating a second embodiment in which the controller calculates data processing time. FIG. 10 is a flowchart for describing the details of step S11 of calculating the data processing time based on the attribute information of the respective valid clusters within the output buffer in FIG. 8. The method of deciding data processing time accordance with the second embodiment may be performed by the operation margin calculation unit 192 (see FIGS. 1 and 6) within the controller 130.

Referring to FIG. 10, the method of deciding data processing time accordance with the second embodiment may include step S30 of checking the number of valid clusters buffering data to be outputted to the host or the external device based on task information (Task ID) of the valid clusters within the output buffer 186, step S32 of comparing the number of valid clusters Valid Cluster_OUT buffering data to be outputted to the host or the external device with the second threshold value TH2, step S34 of calculating data processing time based on the number of valid clusters Valid Cluster_OUT buffering data to be outputted to the host or the external device, when the comparison result indicates that the number of valid clusters (Valid Cluster_OUT) is equal to or more than the second threshold value TH2 (YES), and step S36 of performing the read requests without a pairing operation, when the comparison result indicates that the number of valid clusters Valid Cluster_OUT is less than the second threshold value TH2 (NO).

Specifically, in step S30, the controller may check the number of valid clusters buffering data to be outputted to the host or the external device, based on the task information of the valid clusters within the output buffer 186. For example, referring to FIG. 7, the operation margin calculation unit 192 calculates the number of valid clusters whose task information is 'A', among the plurality of valid clusters. The check result shows that the number of valid clusters buffering data to be outputted to the host or external device is four.

Then, the controller compares the number of valid clusters buffering data to be outputted to the host or the external device with the second threshold value TH2 in step S32.

When the comparison result indicates that the number of valid clusters buffering data to be outputted to the external is equal to or more than the second threshold value TH2 (YES), the controller may calculate the data processing time based on the number of valid clusters buffering data to be outputted to the external, in step S34. For example, suppose that it takes 10 ms for the memory system to transmit one data to the external device. When the number of valid clusters buffering data to be outputted to the external is four, the memory system may have an operation margin of 40 ms (=4×10). For example, when it is assumed that it takes 5 ms to transfer a read request and receive data between the controller and the memory device within the memory system, the controller may try a pairing operation for a maximum of 35 ms in the operation margin of 40 ms.

On the other hand, when the comparison result indicates that the number of valid clusters buffering data to be outputted to the external is less than the second threshold value TH2 (NO), the controller does not perform a pairing operation, but performs read operations through the read requests which are stored in the input buffer 184 up to now and the logical addresses corresponding to the read requests. That is, the controller does not perform the pairing operation until the number of pieces of data temporarily stored in the output buffer 186 is equal to or more than the second threshold value, but performs the read operations in response to the read requests.

Figure 11:
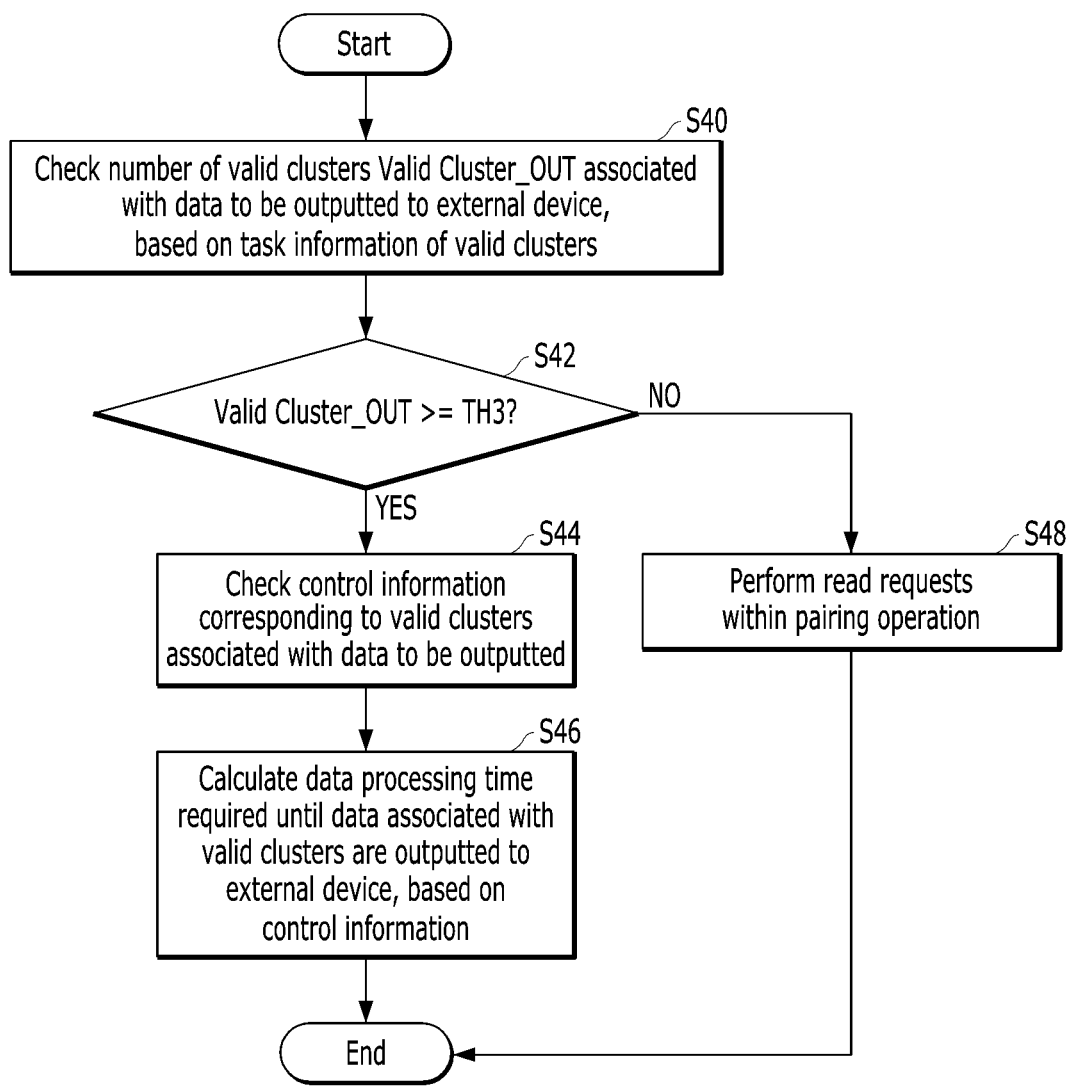
FIG. 11 is a flowchart illustrating a third embodiment in which the controller calculates data processing time.

FIG. 11 is a flowchart illustrating a third embodiment in which the controller calculates data processing time. FIG. 11 is a flowchart for describing the details of step S11 of calculating the data processing time based on the attribute information of the respective valid clusters within the output buffer 186 in FIG. 8. The method of deciding data processing time in accordance with the third embodiment may be performed by the operation margin calculation unit 192 (see FIGS. 1 and 6) within the controller 130.

Referring to FIG. 11, the method of deciding data processing time accordance with the third embodiment may include step S40 of checking the number of valid clusters (Valid Cluster_OUT) buffering data to be outputted to the host or the external device based on the task information (Task ID) of the valid clusters within the output buffer 186, step S42 of comparing the number of valid clusters buffering data to be outputted to the host or the external device with a third threshold value TH3, step S44 of checking the control information for controlling the valid clusters Valid Cluster_OUT associated with data to be outputted to the host or the external device, when the comparison result indicates that the number of valid clusters buffering data to be outputted to the host or the external device is equal to or more than the third threshold value TH3 (YES), step S46 of calculating data processing time to output data from the respective valid clusters to the host or the external device, based on the control information of the respective valid clusters, and step S48 of performing the read requests without a pairing operation, when the comparison result indicates that the number of valid clusters buffering data to be outputted to the host or the external device is less than the third threshold value TH3 (NO).

Specifically, referring to FIG. 11, the controller may check the number of valid clusters buffering data to be outputted to the host or the external device, based on the task information of the valid clusters within the output buffer 186, in step S40. For example, referring to FIG. 7, the operation margin calculation unit 192 calculates the number of valid clusters whose task information is 'A', among the plurality of valid clusters. The check result shows that the number of valid clusters buffering data to be outputted to the host or external device is four. The reason to calculate the number of valid clusters buffering data to be outputted to the host or the external device is because, when a pairing operation is performed on a plurality of read requests and logical addresses corresponding to the read requests in the input buffer 184 without considering the number of pieces of data to be outputted to the host or the external device from the output buffer 186, the data I/O throughput of the memory system 110 may be degraded.

In step S42, the controller may compare the number of valid clusters (Valid Cluster_OUT) buffering data to be outputted to the host or the external device with the third threshold value TH3. When the comparison result indicates that the number of valid clusters buffering data to be outputted to the host or the external device is equal to or more than the third threshold value TH3 (YES), the controller may check the control information corresponding to the valid clusters buffering data to be outputted to the host or the external device in step S44.

In step S46, the controller may calculate the data processing time it takes until the data are outputted from the valid clusters to the host or the external device, based on the control information corresponding to the valid clusters buffering data to be outputted to the host or the external device. That is, through the control information corresponding to the respective valid clusters, the controller may calculate the data processing time by reflecting internal operation time to output data from the respective valid clusters to the external device. The internal operation time may include first processing time for transferring data from the first control unit to the second control unit, second processing time for transferring data from the second control unit to the third control unit, and third processing time for outputting data from the third control unit to the external device. For example, referring to FIG. 7 showing the control information corresponding to the respective valid clusters, the control information corresponding to the zeroth valid cluster is the third identification information, and the third processing time may be the time it takes until the data stored in the zeroth valid cluster is outputted to the host or the external device.

The control information corresponding to the first valid cluster is the second identification information, and the second processing time and the third processing time may be the time it takes until the data stored in the first valid cluster is outputted to the host or the external device.

The control information corresponding to the second valid cluster is the second identification information, and the second processing time and the third processing time may be the time it takes until the data stored in the second valid cluster is outputted to the host or the external device.

The control information corresponding to the third valid cluster is the first identification information, and the first processing time, the second processing time and the third processing time may be the time it takes until the data stored in the third valid cluster is outputted to the host or the external device.

The control information corresponding to the fourth valid cluster is the first identification information, and the first processing time, the second processing time and the third processing time may be the time it takes until the data stored in the fourth valid cluster is outputted to the host or the external device.

The data processing time calculated through the control information corresponding to each of the valid clusters has a value obtained by excluding an overlapped time, because the first to third control units process the data buffered in the respective valid clusters in parallel.

Therefore, the controller may decide the data processing time based on the data to be output last from the valid clusters to the external device, among the data buffered in the valid clusters. That is, the controller may calculate the data processing time by subtracting 1 from the number of valid clusters buffering data to be outputted to the host or the external device, multiplying the subtraction result value by the second processing time, and adding the total operation margin to the multiplication result value, the total operation margin being calculated based on the control information of the data to be output last from the valid clusters to the external device.

The reason to multiply the second processing time is because the valid cluster with the second identification information corresponding to the previous stage of the third identification information waits like a bottleneck phenomenon.

By calculating the data processing time by reflecting the control information corresponding to the valid clusters, the controller may calculate a minimum operation margin for avoiding latency caused by a pairing operation when one or more read requests among the plurality of read request are performed.

On the other hand, when the comparison result of step S42 indicates that the number of valid clusters (Valid Cluster_OUT) is less than the third threshold value TH3 (NO), the controller does not perform a pairing operation, but performs read operations through the read requests which are stored in the input buffer 184 up to now and the logical addresses corresponding to the read requests. That is, the controller does not perform the pairing operation until the number of pieces of data temporarily stored in the output buffer 186 is equal to or more than the third threshold value, but performs the read operations in response to the read requests.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory system comprising:
a plurality of memory dies suitable for storing data therein;
a buffer including a plurality of clusters each suitable for buffering data to be outputted to an external device; and
a controller coupled to the plurality of memory dies through a plurality of channels, and suitable for:
checking control information corresponding to valid clusters among the plurality of clusters, each valid cluster currently buffering data,
deciding an operation margin for performing a pairing operation by calculating data processing time associated with the valid clusters based on the control information, and
performing the pairing operation during the operation margin.

2. The memory system of claim 1, wherein the control information comprises plural pieces of identification information for respectively identifying a plurality of control units which are included in the controller to control the plurality of clusters.

3. The memory system of claim 2, wherein the control information comprises:
first identification information on a first control unit suitable for allocating the valid clusters, in response to a plurality of read requests transferred from the external device, and performing the pairing operation;
second identification information on a second control unit suitable for checking a physical location corresponding to a logical address within the memory die, reading data, and storing the read data in the valid clusters; and
third identification information on a third control unit suitable for outputting the data from the valid clusters to the external device.

4. The memory system of claim 1,
wherein the controller calculates, through the control information, the data processing time by reflecting internal operation time required until data associated with each valid cluster is outputted to the external device, and
wherein the controller decides the data processing time according to a number of pieces of the data buffered in the valid clusters.

5. The memory system of claim 4, wherein the internal operation time comprises:
first processing time for transferring data from the first control unit to the second control unit;
second processing time for transferring data from the second control unit to the third control unit; and
third processing time for outputting data from the third control unit to the external device.

6. The memory system of claim 1, wherein the controller compares the number of valid clusters with a threshold value.

7. The memory system of claim 6, wherein the controller calculates the data processing time when the number of valid clusters is equal to or more than the threshold value.

8. The memory system of claim 1,
wherein the data processing time indicates an operation margin for avoiding latency caused by the pairing operation, and
wherein the controller decides the data processing time based on data which is to be processed last among the data buffered in the valid clusters.

9. The memory system of claim 1,
wherein the controller further determines, before the checking, the number of valid clusters based on task information of the valid clusters, and
wherein the controller calculates data processing time by checking the control information corresponding to the valid clusters when the determined number of valid clusters is equal to or more than a threshold value.

10. The memory system of claim 1, wherein controller performs the pairing operation by matching read requests associated with physical locations where an interleaving operation is possible such that the plurality of memory dies output data corresponding to the matched read requests through the plurality of channels in an interleaving manner.

11. An operating method of a memory system which includes a plurality of memory dies suitable for storing data therein, a buffer including a plurality of clusters each suitable for buffering data to be outputted to an external device and a controller coupled to the plurality of memory dies through a plurality of channels, the operating method comprising:
receiving a plurality of read requests from an external device;
calculating data processing time based on control information of valid clusters within the buffer, each valid cluster currently buffering data, the data processing time being the time it takes to output data from the valid clusters to the external device;
deciding, based on the data processing time, an operation margin for a pairing operation on some of the plurality of read requests;
performing the pairing operation according to logical addresses transferred with the plurality of read requests during the decided data processing time;
transferring the paired read requests to the plurality of memory dies through the plurality of channels;
receiving data corresponding to the paired read requests from the memory dies through the plurality of channels in an interleaving manner; and
outputting the received data to the external device.

12. The operating method of claim 11,
further comprising, before the calculating:
determining the number of valid clusters, and comparing the number of valid clusters with a first threshold value,
wherein the data processing time is calculated by checking the control information of the respective valid clusters when the number of valid clusters is equal to or larger that the first threshold value.

13. The operating method of claim 11, wherein the control information comprises plural pieces of identification information for identifying a plurality of control units which are included in the controller to control the plurality of clusters.

14. The operating method of claim 13, wherein the plural pieces of identification information included in the control information comprise:
first identification information on a first control unit suitable for allocating the valid clusters, in response to the plurality of read request, and performing the pairing operation;
second identification information on a second control unit suitable for checking a physical location corresponding to a logical address within the memory die, reading data, and storing the read data in the valid clusters; and
third identification information on a third control unit suitable for outputting the data from the valid clusters to the external device.

15. The operating method of claim 11,
wherein the data processing time is calculated by reflecting internal operation time required until data associated with each valid cluster is outputted to the external device, and
wherein the data processing time is decided according to a number of pieces of the data buffered in the valid clusters.

16. The operating method of claim 15, wherein the internal operation time comprises:
first processing time for transferring data from the first control unit to the second control unit;
second processing time for transferring data from the second control unit to the third control unit; and
third processing time for outputting data from the third control unit to the external device.

17. The operating method of claim 15, wherein the data processing time is decided based on data which is to be processed last among the data buffered in the valid clusters.

18. The operating method of claim 11, wherein the pairing operation is performed by matching read requests associated with physical locations where an interleaving operation is possible such that the plurality of memory dies output data corresponding to the matched read requests through the plurality of channels in an interleaving manner.

19. A memory system comprising:
a plurality of memory dies suitable for storing data therein;
a buffer including a plurality of clusters each suitable for buffering data to be outputted to an external device; and
a controller coupled to the plurality of memory dies through a plurality of channels, and suitable for performing a pairing operation on at least some of a plurality of read requests such that the plurality of memory dies output data corresponding to the paired read requests through the plurality of channels in an interleaving manner,
wherein the controller checks the number of valid clusters associated with data to be outputted to the external device, based on task information corresponding to valid clusters other than free clusters among a plurality of clusters included in a buffer, decide an operation margin for performing the pairing operation by calculating a data processing time to output data to the external device, and
wherein the controller performs the pairing operation during the data processing time.

20. A memory system comprising:
- a memory device including plural memory dies each having plural sections;
- a buffer suitable for buffering data to be output from the memory system; and
- a controller operably coupled to the memory dies through respective channels and suitable for controlling the memory device to perform an interleaved read operation on sections of a same offset in the respective memory dies under a full synchronous interleaving scheme by pairing two or more discrete read requests based on locations of the sections storing read-requested data within the respective memory dies,
- wherein the controller performs the pairing based on an amount of time expected for the controller to control the buffer to output the buffered data to maintain data I/O throughput of the memory system.

* * * * *